(12) United States Patent
Gorny et al.

(10) Patent No.: US 6,858,303 B2
(45) Date of Patent: Feb. 22, 2005

(54) POLYCARBONATE CONTAINING DIPHENYL CARBONATE AND SHEETS MADE THEREFROM

(75) Inventors: Rüdiger Gorny, Moon Township, PA (US); Siegfried Anders, Köln (DE); Wolfgang Nising, Sankt Augustin (DE); Heidemarie Pantke, Ratingen (DE); James Mason, Carnegie, PA (US); Melanie Möthrath, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/680,543

(22) Filed: Oct. 7, 2003

(65) Prior Publication Data
US 2004/0122147 A1 Jun. 24, 2004

(30) Foreign Application Priority Data
Oct. 9, 2002 (DE) .......................................... 102 46 957

(51) Int. Cl.⁷ ............................................... B32B 27/00
(52) U.S. Cl. ....................... 428/412; 525/461; 525/462; 528/196; 528/198
(58) Field of Search .......................... 428/412; 525/461, 525/462; 528/196, 198

(56) References Cited

U.S. PATENT DOCUMENTS

| | | | |
|---|---|---|---|
| 4,845,193 A | 7/1989 | Umemura et al. | 528/502 |
| 5,108,835 A | 4/1992 | Hähnsen et al. | 428/334 |
| 5,856,012 A | 1/1999 | Kühling et al. | 428/412 |
| 6,303,735 B1 | 10/2001 | Shimoda et al. | 528/196 |
| 6,462,165 B1 | 10/2002 | Ito et al. | 528/196 |

FOREIGN PATENT DOCUMENTS

| | | |
|---|---|---|
| EP | 110 221 | 4/1987 |
| JP | 7-53709 | 2/1995 |
| WO | 01/77206 | 10/2001 |

*Primary Examiner*—Terressa Boykin
(74) *Attorney, Agent, or Firm*—Joseph C. Gil; Aron Preis

(57) ABSTRACT

A thermoplastic molding composition comprising polycarbonate and 50 ppm to 300 ppm, in relation to the weight of the composition, of diphenyl carbonate is disclosed. The composition is especially suitable for the preparation of extruded sheets, in particular coextruded.

9 Claims, No Drawings

POLYCARBONATE CONTAINING DIPHENYL CARBONATE AND SHEETS MADE THEREFROM

FIELD OF THE INVENTION

The invention relates to thermoplastic molding compositions and more particularly to polycarbonate containing compositions and to articles made therefrom.

SUMMARY OF THE INVENTION

A thermoplastic molding composition comprising polycarbonate and 50 ppm to 300 ppm, in relation to the weight of the composition, of diphenyl carbonate is disclosed. The composition is especially suitable for the preparation of extruded sheets, in particular coextruded.

TECHNICAL BACKGROUND OF THE INVENTION

The term diphenol is also used for the term bisphenol. Here, the polycarbonate is in particular bisphenol A homopolycarbonate. Bisphenol A is 2,2-bis(4-hydroxyphenyl)propane.

Polycarbonate sheets are known from EP-A 0 110 221 and are supplied for a multitude of applications. They are produced, for example, by extrusion of compositions containing polycarbonate (so-called polycarbonate molding compositions). Multi-layer sheets may be obtained, for example, by coextrusion with polycarbonate molding compositions that contain an increased proportion of UV absorbers.

Polycarbonate molding compositions are understood to mean compositions that contain polycarbonate and that may be formed thermoplastically into molded articles. Coextrusion molding compositions are understood to mean compositions that may be used in the production of multi-layer products, in particular multi-layer sheets, by the coextrusion process.

A problem that recurs frequently when extruding such sheets is the deposition of volatile constituents from the molding compositions on the devices that are used to produce the sheets.

When producing so-called multi-wall sheets (also known as cellular sheets) deposits occur in particular on the so-called calibrator.

Calibrators are known to the person skilled in the art of extrusion technology. They are disclosed, for example, in Kunststoffhandbuch, Volume 3/1, Polycarbonate, Polyacetale, Polyester, Celluloseester, 1992, Carl Hanser Verlag, Munich, Vienna, Page 251 ff, Chapter 3.8.12.2

When producing solid sheets, deposits occur in particular on the rollers, which are a component of the device for the production of solid sheets.

These deposits may lead to surface defects in the sheets.

Volatile constituents, which may be deposited, are for example UV absorbers, mold release agents and other low-molecular constituents of the molding compositions used.

EP-A 0 320 632 discloses co-extruded sheets of polycarbonate, which may contain a UV absorber and a mold lubricant. The disadvantage is that during longer extrusion times, in particular during coextrusion, the surface of the sheets may be adversely affected by vapors emitted by the polycarbonate melt. The increased evaporation of the UV absorber from the polycarbonate melt results in the formation of deposits on the calibrator or the rollers and finally in the formation of defects on the surface of the sheet (e.g. white spots, corrugation etc.).

Polycarbonate abrasion also leads to pulverulent deposits on the co-extruded polycarbonate sheets at the calibrator.

EP-A 0 649 724 discloses a process for the production of multi-layer plastic panels of branched polycarbonates with a weight average molecular weight ($\overline{M}_w$) of 27,000 to 29,500 g/mol by co-extrusion of a core layer and at least one top layer containing 1 to 15 wt. % of a UV absorber. If the mold release agents glycerine monostearate, pentaerythritol tetrastearate and mixtures thereof with glycerine monostearate, disclosed in EP-A 0 300 485, are used as the main component in the molding compositions for the production of these plastic panels, the surface of the sheets still deteriorates over time.

Sheets of polycarbonate are also disclosed in EP-A 0 735 074, DE-A 197 27 709, WO 2001/05867, WO 2001 05866, EP-A 0 709 421, EP-A 0 712 878, WO 2001/36511, JP-A 2000254954, JP-A 2000281817, JP-A 2000302893 and JP-A 2000302894. Here, the polycarbonate is produced from diphenols and carbonic acid diaryl esters by transesterification.

JP-A 07053709 discloses a process for the production of polycarbonate by transesterification, wherein the polycarbonate contains less than 0.4 ppm diphenyl carbonate.

WO 00/77073 discloses a process for the production of polycarbonate by transesterification in the melt, wherein the polycarbonate has less than 5 ppm diphenyl carbonate and other low-molecular compounds.

DETAILED DESCRIPTION OF THE INVENTION

The object of the present invention is thus to provide compositions containing the polycarbonate, wherein these compositions may be extruded or co-extruded into sheets, without the disadvantages of the prior art described above.

This object is achieved by a composition containing polycarbonate and 50 ppm to 300 ppm, in relation to the weight of the composition, diphenyl carbonate. This composition is provided by the present invention.

The present invention further provides a process for the production of the composition according to the invention, comprising the production of the polycarbonate from diphenols and carbonic acid diaryl esters by transesterification.

The present invention further provides a multi-layer product, preferably a multi-layer sheet, comprising at least one layer A and at least one layer B, layer A containing polycarbonate or polyestercarbonate and layer B containing the composition according to the invention.

In a particular embodiment, layer A contains bisphenol-A homopolycarbonate.

The present invention further provides a process for the production of the multi-layer product according to the invention, comprising the coextrusion of the polycarbonate or polyestercarbonate contained in layer A, and the composition contained in layer B.

An advantage of the compositions according to the invention is that, when producing sheets from these compositions by extrusion or co-extrusion, the extruded sheets maintain a good surface quality even during a long, continuous process. Deposits that impair the quality of the surface of the sheets do not form. The composition containing polycarbonate according to the invention contains 50 ppm to 300 ppm, preferably 70 ppm to 250 ppm, particularly preferably 100 ppm to 200 ppm, in relation to the weight of the composition, of diphenyl carbonate.

In a particular embodiment, the composition according to the invention contains a quantity of at least 80 wt. % polycarbonate in relation to the weight of the composition.

In a particular embodiment, the composition according to the invention contains bisphenol A homopolycarbonate.

In a particular embodiment, the composition according to the invention additionally contains UV absorbers. This may be one or several different UV absorbers.

In a particular embodiment the UV absorber is present in a quantity of 0 to 1 wt. % in relation to the weight of the composition.

In a particular embodiment the composition according to the invention additionally contains low-volatility UV absorbers. This may be one or several different low-volatility UV absorbers.

In a particular embodiment the low-volatility UV absorber is present in a quantity of 1 to 20 wt. % in relation to the weight of the composition.

The polycarbonate contained in the composition according to the invention may be produced by conventional processes. It may be produced for example from diphenols and carbonic acid diaryl esters by transesterification. It may be produced for example from phosgene and bisphenols or sodium bisphenolates (in particular by the so-called phase interface process).

Both processes (transesterification and the phase interface process) are described in Schnell, Chemistry and Physics of Polycarbonates, Polymer Reviews, Volume 9, Interscience Publishers, New York, London, Sydney, 1964, and in D. C. PREVORSEK, B. T. DEBONA and Y. KESTEN, Corporate Research Center, Allied Chemical Corporation, Moristown, N.J. 07960, Synthesis of Poly(ester)carbonate Copolymers in Journal of Polymer Science, Polymer Chemistry Edition, Volume 19, Pages 75 to 90 (1980), and in D. Freitag, U. Grigo, P. R. Müller, N. Nouvertne, BAYER AG, "Polycarbonates" in Encyclopedia of Polymer Science and Engineering, Volume 11, Second Edition, 1988, Pages 648 to 718 and in U. Grigo, K. Kircher and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, Pages 117 to 299.

The polycarbonate of the composition according to the invention is preferably produced from diphenols and carbonic acid diaryl esters by transesterification. Transesterification takes place in the melt. With this production method, the polycarbonate may already contain diphenylcarbonate. In this way, the composition according to the invention may be obtained without the need to add diphenyl-carbonate to the polycarbonate. At least, less diphenylcarbonate need be added than if a polycarbonate containing no diphenylcarbonate is used as the starting material.

A process for the production of polycarbonate from diphenols and carbonic acid diaryl esters by transesterification is described below. The polycarbonate, which may also be a polyestercarbonate, is produced by the melt-transesterification reaction of suitable diphenols and carbonic acid diaryl esters in the presence of a suitable catalyst. The polycarbonate may also be obtained by condensation of carbonate oligomers, which contain hydroxy terminal groups or carbonate terminal groups, and suitable diphenols and carbonic acid diaryl esters.

The production of polycarbonates by the phase interface process is preferably carried out as follows. An aqueous solution of the alkali salt of a bisphenol is brought intensively into contact with a solution of phosgene in an organic solvent, for example a halogenated hydrocarbon. Polycondensation takes place at the phase interface of the two-phase mixture.

Suitable carbonic acid diaryl esters in connection with the invention are di-$C_6$ to $C_{14}$-aryl esters, preferably the di-esters of phenol or of alkyl-substituted phenols, i.e. diphenyl carbonate, dicresyl carbonate and di-4-tert.-butylphenyl carbonate. Diphenyl carbonate is most preferred.

Suitable carbonate oligomers preferably have an average molar weight of 220 to 15 000 g/Mol.

The suitable di-$C_6$-$C_{14}$-aryl esters also include asymmetric diaryl esters, which contain a mixture of aryl substituents. Phenylcresyl carbonate and 4-tert.-butylphenyl phenyl carbonate are particularly preferred.

The suitable diaryl esters also include mixtures of more than one di-$C_6$-$C_{14}$-aryl ester. Particularly preferred mixtures are mixtures of diphenyl carbonate, dicresyl carbonate and di-4-tert.-butylphenyl carbonate.

In relation to 1 mol diphenol, the carbonic acid diaryl esters may be used in quantities of 1.00 to 1.30 mol, particularly preferably in quantities of 1.02 to 1.20 mol and very particularly preferably in quantities of 1.05 to 1.15 mol.

Suitable dihydroxybenzene compounds in connection with the invention are those corresponding to the formula (5):

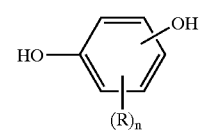

wherein
R is a substituted or non-substituted phenyl, methyl, propyl, ethyl, butyl, Cl or Br and n stands for 0, 1 or 2.

Particularly preferred dihydroxybenzene compounds are 1,3-dihydroxybenzene, 1,4-dihydroxybenzene and 1,2-dihydroxybenzene.

Suitable diphenols in connection with the invention are those corresponding to the formula (6):

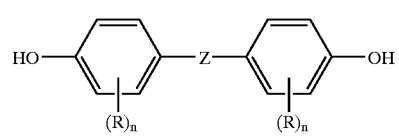

wherein
Z stands for $C_1$–$C_8$-alkylidene or $C_5$–$C_{12}$-cycloalkylidene, S, $SO_2$ or a single bond and
R is substituted or non-substituted phenyl, methyl, propyl, ethyl, butyl, Cl or Br and
n stands for 0, 1 or 2.

Preferred diphenols are 4,4'-dihydroxydiphenyl, 4,4'-dihydroxydiphenyl sulfide, 1,1-bis(4-hydroxphenyl)cyclohexane, 1,2-bis(4-hydroxyphenyl)benzene, 1,3-bis(4-hydroxyphenyl)benzene, 1,4-bis(4-hydroxyphenyl)benzene, bis(4-hydroxy-phenyl)methane, 2,2-bis(4-hydroxyphenyl) propane, 2,4-bis(4-hydroxyphenyl)-2-methylbutane, 2,2-bis (3-methyl-4-hydroxy-phenyl)-propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)

propane, bis(3,5-dimethyl-4-hydroxy-phenyl)sulfone, bis(4-hydroxyphenyl)sulfone, 1,2-bis[2-(4-hydroxy-phenyl)isopropyl]benzene, 1,3-Bis[2-(4-hydroxyphenyl)isopropyl]benzene, 1,4-bis[2-(4-hydroxyphenyl)iso-propyl]benzene, 1,1-bis(4-hydroxyphenyl)-1-phenylethane, 2,4-bis(4-hydroxy-phenyl)-2-methylbutane, 2,2-bis(3,5-dichloro-4-hydroxy-phenyl)-propane, 2,2-bis(3,5-dibromo-4-hydroxyphenyl)propane, 1,1-bis(4-hydroxyphenyl)-3,3,5-trimethylcyclohexane.

The particularly preferred diphenols are 1,1-bis(4-hydroxyphenyl)-1-phenyl-ethane, 2,2-bis(4-hydroxyphenyl)propane, 4,4'-dihydroxydiphenyl, 1,1-bis(4-hydroxyphenyl)-3,3,5-trimethylcyclohexane, 2,2-bis(3,5-dibromo-4-hydroxy-phenyl)propane and 1,3-bis[2-(4-hydroxyphenyl)isopropyl]benzene.

The suitable diphenols also include mixtures of more than one diphenol. This produces a copolycarbonate. Particularly preferred mixtures are 1,3-bis[2-(4-hydroxyphenyl)isopropyl]benzene, 1,1-Bis(4-hydroxyphenyl)-3,3,5-trimethyl-cyclohexane, 2,2-bis(4-hydroxyphenyl)propane, 4,4'-dihydroxydiphenyl and 2,2-bis(3,5-dibromo-4-hydroxyphenyl)propane.

The diphenols may contain small amounts of dihydroxybenzene compounds according to formula (5).

A branching agent may also be added, such as for example compositions containing tri-functional phenolic OH groups. This results in branching of the polymer, thus increasing the non-Newtonic flow behaviour of the polymer.

Suitable branching agents include phloroglucinol, 3,3-bis(3-methyl-4-hydroxyphenyl)-2-oxo-2,3-dihydroindol, 4,6-dimethyl-2,4,6-tris(4-hydroxyphenyl)heptene-2,4,6-dimethyl-2,4,6-tris(4-hydroxyphenyl)-heptane, 1,3,5-tris(4-hydroxyphenyl)benzene, 1,1,1-tris(4-hydroxyphenyl)ethane, tris(4-hydroxyphenyl)phenyl methane, 2,2-bis[4,4-bis(4-hydroxyphenyl)cyclo-hexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl) propane, hexakis(4-(4-hydroxyphenylisopropyl)phenyl)orthotere-phthalate, tetrakis(4-hydroxyphenyl)methane, tetrakis(4-(4-hydroxyphenyl-isopropyl) phenoxy)methane and 1,4-bis((4',4"-dihydroxy-triphenyl)methyl)benzene, isatinbiscresol, pentaerythritol, 2,4-dihydroxybenzoic acid, trimesic acid, cyanuric acid. Catalysts suitable for the production of the polycarbonates according to the invention are, for example, those of the general formula (7)

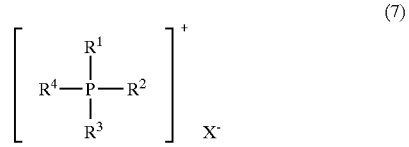

(7)

in which $R^1$, $R^2$, $R^3$ and $R^4$ may mean identical or different $C_1$ to $C_{18}$-alkylenes, $C_6$ to $C_{10}$-aryls or $C_5$ to $C_6$-cycloalkyls and $X^-$ stands for an anion in which the corresponding acid-base-pair ($H^+ + X^- \leftrightharpoons HX$) has a $pK_b$ of <11.

Preferred catalysts are tetraphenyl phosphonium fluoride, tetraphenyl phosphonium tetraphenyl borate and tetraphenyl phosphonium phenolate. Tetraphenyl phosphonium phenolate is particularly preferred.

Preferred quantities of phosphonium salt catalysts are $10^{-2}$ to $10^{-8}$ mol per mol diphenol and the particularly preferred catalyst quantities are $10^{-4}$ to $10^{-6}$ mol per mol diphenol.

Further co-catalysts may optionally be used in addition to the phosphonium salt, to increase the speed of polymerization. These include salts of alkali metals and earth alkali metals, such as hydroxides, alkoxides and aryloxides of lithium, sodium and potassium, preferably hydroxide, alkoxide or aryloxide salts of sodium.

Sodium hydroxide and sodium phenolate are particularly preferred.

The quantities of co-catalyst may be, for example, in the range 1 to 200 ppb, preferably 5 to 150 ppb and particularly preferably 10 to 125 ppb, calculated as sodium in each case.

The polycarbonates may be produced under reaction conditions, which are carried out in stages at temperatures of 150 to 400° C.; the dwell time in each stage may be 15 minutes to 5 hours, and the pressures are 1000 to 0.01 mbar.

The composition according to the invention may contain conventional additives for their art-recognized utility in the context of polycarbonate compositions.

The compositions according to the invention (co-extrusion molding compositions) offer advantages on any polycarbonate molding composition as a base material. There is a particular advantage if the coextrusion molding composition and the base material are provided with the same mold release agent.

The compositions according to the invention may be used as co-extrusion molding compositions to produce solid plastic sheets or so-called multi-wall sheets (also known as cellular sheets, e.g. twin-wall sheets).

Sheets may also be produced, which have an additional top layer on one or both sides, containing the co-extrusion molding composition according to the invention with a certain content of UV absorber.

The compositions according to the invention facilitate the production of polycarbonate molded bodies, in particular sheets and molded articles produced from them such as e.g. window panels for greenhouses, conservatories, bus shelters, advertising boards, signs, safety screens, car windows, windows and roofing.

Subsequent processing of the extruded bodies coated with the compositions according to the invention, such as for example deep drawing, or surface processing, such as for example applying scratch-resistant varnish, water-repellent coatings and similar, is possible and the molded articles produced by these processes are also provided by the present invention.

Co-extrusion as such is known in literature (see for example EP-A 0 110 221 and EP-A 0 110 238). In the present case the preferred method is as follows: Extruders for producing the core layer and top layer(s) are connected to a co-extrusion adapter. The adapter is constructed in such a way that a thin layer of the melt forming the top layer(s) is applied adhesively to the melt of the core layer. The multi-layer melt strand thus produced is then converted to the desired form (multi-wall or solid sheet) in the nozzle connected after this. The melt is then cooled under controlled conditions in the known way by calendering (solid sheet) or vacuum calibration (multi-wall sheet) and then cut into sections. After calibration, a tempering oven may optionally be used to eliminate stresses. Instead the adapter fitted in front of the nozzle, the nozzle itself may also be designed in such a way that the melts are combined there.

EXAMPLES

The following examples serve to illustrate the invention. The examples are only particular embodiments of the invention. The invention is not restricted to the scope of the examples.

Production of Polycarbonate 1:

Polycarbonate 1 was produced by polycondensation from diphenyl carbonate and bisphenol A in the melt using tetraphenyl phosphonium phenolate as the catalyst. Polycarbonate 1 had a melt flow rate (MFR) to ISO 1133 of 5.8 g/10 min at 300° C. and 1.2 kg load.

Production of the Compositions (Compounds):

The substance mixtures for which the recipes are given in the following table were mixed and extruded (compounded) in a twin-screw extruder at 310° C. and then granulated. The percentages are all given as wt. %.

| Compound | Base material | UV-Absorber | Mold release agent | Other |
|---|---|---|---|---|
| A | Makrolon ® 3108 | 5% Tinuvin ® 360*) | 0.1% PETS***) | |
| B | Polycarbonate 1 | 5% Tinuvin ® 360*) | 0.1% PETS***) | |
| C | Makrolon ® 3108 | 4% Tinuvin ® 1577**) | — | |
| D | Polycarbonate 1 | 4% Tinuvin ® 1577**) | — | |
| E | Polycarbonate 1 | 5% Tinuvin ® 360*) | 0.1% PETS***) | 0.04% Diphenylcarbonate |

*)2,2'-methylenebis[4-(1,1,3,3-tetramethylbutyl)-6-(2H-benzotriazol-2-yl)phenol]; available commercially from Ciba Spezialitätenchemie, Lampertheim, Germany
**)2-(4,6-diphenyl-1,3,5-triazin-2-yl)-5-hexyloxyphenol; available commercially from Ciba Spezialitätenchemie, Lampertheim, Germany
***)Pentaerythritol tetrastearate available commercially from Cognis, Düsseldorf, Germany
Makrolon ® 3108 is a linear bisphenol A homopolycarbonate with a melt flow rate (MFR) to ISO 1133 of 6.5 g/10 min at 300° C. and 1.2 kg load; Makrolon ® 3108 is available commercially from Bayer AG, D-51368 Leverkusen, Germany.

The content of diphenyl carbonate (DPC) in the compounds was determined by HPLC (High-Pressure Liquid Chromatography). The results were as follows:

| Compound | DPC content |
|---|---|
| A | 36 ppm |
| B | 133 ppm |
| C | 36 ppm |
| D | 133 ppm |
| E | 330 ppm |

Compound E contains only 330 ppm diphenyl carbonate, although according to the recipe 400 ppm were added. Part of the diphenyl carbonate appears to have evaporated off during production of the compound.

Production of Twin-Wall Sheets:

Twin-wall sheets (also known as cellular sheets) with a thickness of 10 mm, as disclosed for example in EP-A 0 110 238, were produced from the following molding compositions: Makrolon® 1243 (branched bisphenol A homopolycarbonate from Bayer AG, D-51368 Leverkusen, Germany, with a melt flow rate (MFR) to ISO 1133 of 6.5 g/10 min at 300° C. and 1.2 kg load) was used as the base material. This was co-extruded with the compounds A, B and E given in the table above. The compounds A, B and E contain polycarbonate 1 or Makrolon® 3108 produced in the phase interface process. The co-extrusion layer was about 50 μm thick in each case.

Production Of Solid Sheets:

Solid sheets with a thickness of 2 mm were produced from Makrolon® 3103 (linear bisphenol A homopolycarbonate with a melt flow rate (MFR) to ISO 1133 of 6.5 g/10 min at 300° C. and 1.2 kg load, commercially available from Bayer AG, D-51368 Leverkusen, Germany). This was co-extruded with the compounds C and D given in the table based on polycarbonate 1 or Makrolon® 3108 produced in the phase interface process. The co-extruded layer was about 60 μm thick in each case.

The machines and apparatus used to produce multi-layer sheets are described below:

The device for the production of twin-wall sheets consisted of:
- the main extruder with a screw 33 D long and 70 mm in diameter, vented
- the coex-adapter (feed block system)
- a co-extruder to apply the top layer with a screw 25 D long and 30 mm in diameter
- the special flat sheet die 350 mm wide
- the calibrator
- the roller train
- the take-off device
- the sectioning device (saw)
- the receiving table.

The device for the production of solid sheets consisted of:
- the main extruder with a screw 33 D long and 60 mm in diameter, vented
- the coex-adapter (feed block system)
- a co-extruder to apply the top layer with a screw 25 D long and 30 mm in diameter
- the special flat sheet die, 350 mm wide
- the polishing stack
- the roller train
- the take-off device
- the sectioning device (saw)
- the receiving table.

The polycarbonate granulate of the base material is placed in the filling hopper of the main extruder and the co-extrusion material containing the UV-absorber in that of the co-extruder. Each material was melted and fed on in the respective plasticising system (cylinder/screw). The two material melts are combined in the coex-adapter and, after leaving the nozzle and cooling in the calibrator, formed a compound. The other devices were used to transport, section and receive the extruded sheets.

Evaluation of the Co-Extrusion Trials:

Co-extrusion with Compound A (Reference):

The first widespread defects arose after 2.5 hours

After 4 hours the sheet surface broke up.

The overall evaluation score is thus: poor

Co-Extrusion with Compound B (According to the Invention):

The first small deposits arose after 2.5 hours

The first widespread defects occurred after 3.5 hours

No break-up of the sheet surface was observed

The overall evaluation score is thus: good

Co-Extrusion with Compound C (Reference):

The first roller deposits arose after 30 minutes. This had a very slight negative effect on the sheet quality Larger deposits on the rollers arose after 3 hours accompanied by a visible roughening of the sheet surface The overall evaluation score is thus: poor Co-Extrusion with Compound D (According to the Invention):

The roller deposits were significantly lower over the whole extrusion time of 4 hours than with compound C There was no detrimental effect on the surface of the sheets The overall evaluation score is thus: good Co-Extrusion with Compound E (Reference):

The first small deposits arose after 1.5 hours

The first wide-spread defects arose after 1 hour and 45 minutes

The overall evaluation score is thus: poor

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A coextruded multi-layered product comprising at least one layer A and at least one layer B, wherein layer A contains polycarbonate or polyestercarbonate, and layer B contains polycarbonate and diphenyl carbonate, the diphenyl carbonate present in amount of 50 ppm to 300 ppm in relation to the weight of layer B.

2. The product according to claim 1, having a layer sequence B-A-B.

3. The product according to claim 1 wherein layer A contains bisphenol A homopolycarbonate.

4. The multi-layer product according to claim 1 in the form of a sheet.

5. The multi-layer product according to claim 2 wherein layer A contains bisphenol A homopolycarbonate.

6. The product of claim 1 in the form of a film.

7. The product of claim 1 wherein layer B contains polycarbonate in an amount of at least 80% relative to its weight.

8. The product of claim 1 wherein layer A further contains a UV absorber in an amount of 3 to 5% relative to the weight of layer A.

9. The product of claim 1 in the form of a twin-wall sheet.

* * * * *